United States Patent
Somerville Roberts et al.

(10) Patent No.: US 10,550,357 B2
(45) Date of Patent: Feb. 4, 2020

(54) WATER-SOLUBLE UNIT DOSE ARTICLE COMPRISING A SOLID LAUNDRY DETERGENT COMPOSITION

(71) Applicant: The Procter & Gamble Company, Cincinnati, OH (US)

(72) Inventors: Nigel Patrick Somerville Roberts, Northumberland (GB); Alan Thomas Brooker, Newcastle upon Tyne (GB); Carly Pickering, Tyne & Wear (GB); Ned Peter Buijs, Newcastle upon Tyne (GB)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

(21) Appl. No.: 16/005,726

(22) Filed: Jun. 12, 2018

(65) Prior Publication Data
US 2018/0362904 A1  Dec. 20, 2018

(30) Foreign Application Priority Data

| Jun. 15, 2017 | (EP) | 17176195 |
| Jun. 15, 2017 | (EP) | 17176198 |
| Jun. 15, 2017 | (EP) | 17176200 |
| Jun. 15, 2017 | (EP) | 17176203 |
| Jun. 15, 2017 | (EP) | 17176226 |

(51) Int. Cl.
| C11D 17/00 | (2006.01) |
| C11D 17/04 | (2006.01) |
| C11D 17/06 | (2006.01) |
| C11D 3/10 | (2006.01) |
| C11D 3/20 | (2006.01) |
| C11D 3/22 | (2006.01) |
| C11D 3/42 | (2006.01) |
| C11D 3/37 | (2006.01) |
| C11D 3/386 | (2006.01) |
| C11D 3/50 | (2006.01) |
| C11D 1/14 | (2006.01) |
| C08L 29/04 | (2006.01) |

(52) U.S. Cl.
CPC ............ *C11D 17/045* (2013.01); *C08L 29/04* (2013.01); *C11D 1/143* (2013.01); *C11D 1/146* (2013.01); *C11D 3/10* (2013.01); *C11D 3/2086* (2013.01); *C11D 3/222* (2013.01); *C11D 3/3761* (2013.01); *C11D 3/38636* (2013.01); *C11D 3/38645* (2013.01); *C11D 3/38654* (2013.01); *C11D 3/42* (2013.01); *C11D 3/505* (2013.01); *C11D 17/044* (2013.01); *C11D 17/06* (2013.01); *C08L 2203/16* (2013.01)

(58) Field of Classification Search
CPC ..... C11D 17/045; C11D 17/044; C11D 3/386; C11D 3/50; C11D 3/38618; C11D 3/38627; C11D 3/42; C11D 3/505; C11D 3/40; C11D 3/38609; C11D 3/10; C11D 3/222; C11D 3/3761; C11D 3/38636; C11D 9/44; C11D 3/502; C11D 3/38654; C11D 7/04; B65D 75/327
See application file for complete search history.

(56) References Cited

U.S. PATENT DOCUMENTS

| 5,132,036 | A | 7/1992 | Falou et al. |
| 6,878,679 | B2 | 4/2005 | Sommerville-Roberts et al. |
| 7,386,971 | B2 | 6/2008 | Catlin et al. |
| 7,595,290 | B2 | 9/2009 | Pounds et al. |
| 2003/0087784 | A1* | 5/2003 | Somerville-Roberts ............ B65D 81/3272 510/296 |
| 2005/0229260 | A1 | 10/2005 | Feichtinger et al. |
| 2009/0011970 | A1* | 1/2009 | Evers ............ C11D 17/045 510/277 |
| 2015/0267155 | A1* | 9/2015 | Brooker ............ C11D 17/045 8/137 |
| 2015/0275157 | A1* | 10/2015 | Souter ............ C11D 3/361 510/296 |
| 2016/0040105 | A1 | 2/2016 | Depoot et al. |
| 2016/0177236 | A1 | 6/2016 | Brooker et al. |
| 2018/0094212 | A1 | 4/2018 | Chieffi et al. |
| 2018/0094215 | A1 | 4/2018 | Chieffi et al. |
| 2018/0094219 | A1 | 4/2018 | Chieffi et al. |
| 2018/0094220 | A1 | 4/2018 | Chieffi et al. |
| 2018/0094221 | A1 | 4/2018 | Chieffi et al. |
| 2018/0094222 | A1 | 4/2018 | Chieffi et al. |
| 2018/0094223 | A1 | 4/2018 | Chieffi et al. |
| 2018/0094224 | A1 | 4/2018 | Chieffi et al. |
| 2018/0094225 | A1 | 4/2018 | Chieffi et al. |
| 2018/0094228 | A1 | 4/2018 | Chieffi et al. |

FOREIGN PATENT DOCUMENTS

| EP | 3301145 A1 | 4/2018 |
| EP | 3301146 A1 | 4/2018 |
| EP | 3301147 A1 | 4/2018 |
| EP | 3301148 A1 | 4/2018 |

(Continued)

OTHER PUBLICATIONS

U.S. Appl. No. 16/005,723, filed Jun. 12, 2018, Nigel Patrick Someville Roberts.
U.S. Appl. No. 16/005,724, filed Jun. 12, 2018, Nigel Patrick Someville Roberts.
EP Search Report for application No. 17176223.0-1358, dated Nov. 27, 2017, 12 pages.
Search Report foe application No. 17176195.0-1358, dated Dec. 13, 2017, 7 pages.

*Primary Examiner* — Eisa B Elhilo
(74) *Attorney, Agent, or Firm* — Gregory S Darley-Emerson

(57) ABSTRACT

Water-soluble unit dose article containing solid laundry detergent composition and water-soluble film.

20 Claims, No Drawings

(56) References Cited

FOREIGN PATENT DOCUMENTS

| EP | 3301149 A1 | 4/2018 |
| EP | 3301158 A1 | 4/2018 |
| EP | 3301160 A1 | 4/2018 |
| EP | 3301161 A1 | 4/2018 |
| EP | 3301169 A1 | 4/2018 |

* cited by examiner

WATER-SOLUBLE UNIT DOSE ARTICLE COMPRISING A SOLID LAUNDRY DETERGENT COMPOSITION

FIELD OF THE INVENTION

The present invention relates to water-soluble unit dose articles containing solid laundry detergent compositions and methods of using them.

BACKGROUND OF THE INVENTION

Water-soluble laundry unit dose articles are known and are liked by consumers due to their ease and efficiency of use in the laundry operation. Water-soluble unit dose articles comprise water-soluble film defining at least one internal compartment. A laundry detergent composition is housed within the internal compartment. Upon exposure to water, the water-soluble film dissolves/disintegrates releasing the laundry detergent composition into the surrounding water.

The laundry detergent composition may be a solid laundry detergent composition. Such detergent compositions comprise known laundry detergent cleaning actives. One preferred active ingredient is an optical brightener.

Due to their compact form, water-soluble unit dose articles have limited space for formulating the solid laundry detergent compositions. This can result in lower than desired cleaning performance as extra detergent composition cannot simply be added to compensate for any under-performance. Addition of further detergent composition to the water-soluble unit dose article would require making the unit dose article bigger making it less convenient and also could contribute to negatives such as impaired dissolution when additional water soluble film would be required to accommodate the bigger water soluble unit dose article and/or reduced structural stability of the unit dose article especially when further stretching the original water soluble film to accommodate the bigger water soluble unit dose article (the film may not provide sufficient structural stability for the volume of solid detergent composition added).

Therefore, there is a need in the art to provide improved performance of said water-soluble unit dose articles without addition of increased levels of solid laundry detergent composition to the unit dose articles.

It was surprisingly found that a water-soluble unit dose article comprising a solid laundry detergent composition having a particular pH (upon dilution of the solid laundry detergent composition) provided improved fabric whiteness performance of a whitening agent formulated in said solid laundry detergent composition as compared to water-soluble unit dose articles having a solid laundry detergent composition having a higher pH (upon dilution of the solid laundry detergent composition) as known from the art.

SUMMARY OF THE INVENTION

A first aspect of the present invention is a water-soluble unit dose article comprising a water-soluble film and a solid laundry detergent composition, wherein the water-soluble film defines a first internal compartment and wherein the solid laundry detergent composition is comprised within the first internal compartment, and wherein the water-soluble unit dose article composition comprises;
 a. between about 0.05% and about 2% by weight of the solid laundry detergent composition of a whitening agent selected from a hueing dye and an optical brightener;
 b. between about 0.001% and about 1% by weight of the solid laundry detergent composition of the enzyme;
 c. a stain removal active selected from acrylate/maleate random copolymer, a chelant or a mixture thereof, and wherein if present the acrylate/maleate random copolymer comprises between about 0.5% and about 15%, by weight of the solid laundry detergent composition and if present the chelant comprises between about 1% and about 20% by weight of the solid laundry detergent composition;
 d. between about 0.05% and about 5% by weight of the solid laundry detergent composition of a cationically modified polysaccharide;
 e. a capsule, wherein the capsule comprises a shell and a core wherein the core comprises a perfume and wherein the perfume is present between about 0.05% and about 10% by weight of the liquid laundry detergent composition of the perfume;
 f. or a mixture thereof;
wherein the solid composition at about 1 wt % dilution in deionized water at about 20° C., has an equilibrium pH in the range of from about 6.5 to about 8.8.

A second aspect of the present invention is a method of washing comprising the steps of adding the water-soluble unit dose article according to the present invention to sufficient water to dilute the solid laundry detergent composition by a factor of at least 300 fold to create a wash liquor and contacting fabrics to be washed with said wash liquor.

DETAILED DESCRIPTION OF THE INVENTION

Water-Soluble Unit Dose Article

The present invention is to a water-soluble unit dose article comprising a water-soluble film and a solid laundry detergent composition.

The water-soluble film is described in more detail below.

The solid laundry detergent composition is described in more detail below.

The water-soluble unit dose article comprises the water-soluble film shaped such that the unit-dose article comprises at least a first internal compartment surrounded by the water-soluble film. The compartment should be understood as meaning a closed internal space within the unit dose article, which holds the solid laundry detergent composition. The unit dose article may comprise a first water-soluble film and a second water-soluble film sealed to one another such to define the internal compartment. The water-soluble unit dose article is constructed such that the solid laundry detergent composition is comprised within the first internal compartment. The water-soluble unit dose article is constructed such that the solid laundry detergent composition does not leak out of the compartment during storage. However, upon addition of the water-soluble unit dose article to water, the water-soluble film dissolves and releases the contents of the internal compartment into the wash liquor.

During manufacture, a first water-soluble film may be shaped to comprise an open compartment into which the solid laundry detergent composition is added. A second water-soluble film is then laid over the first film in such an orientation as to close the opening of the compartment. The first and second films are then sealed together along a seal region.

The unit dose article may comprise more than one compartment, even at least two compartments, or even at least three compartments. The compartments may be arranged in superposed orientation, i.e. one positioned on top of the other. In such an orientation the unit dose article will comprise at least three films, top, middle and bottom. Alternatively, the compartments may be positioned in a side-by-side orientation, i.e. one orientated next to the other. The compartments may even be orientated in a 'tyre and rim' arrangement, i.e. a first compartment is positioned next to a second compartment, but the first compartment at least partially surrounds the second compartment, but does not completely enclose the second compartment. Alternatively one compartment may be completely enclosed within another compartment.

Wherein the unit dose article comprises at least two compartments, one of the compartments may be smaller than the other compartment. Wherein the unit dose article comprises at least three compartments, two of the compartments may be smaller than the third compartment, and preferably the smaller compartments are superposed on the larger compartment. The superposed compartments preferably are orientated side-by-side.

In a multi-compartment orientation, the detergent composition according to the present invention may be comprised in at least one of the compartments. It may for example be comprised in just one compartment, or may be comprised in two compartments, or even in three compartments.

Each compartment may comprise the same or different compositions. The different compositions could all be in the same form, or they may be in different forms.

The water-soluble unit dose article may comprise at least a first compartment and a second compartment, preferably at least a first compartment, a second compartment and a third compartment. Preferably, the compartments are arranged in a side-by-side arrangement, a superposed arrangement or a mixture thereof. Preferably, at least the second compartment, more preferably at least the second compartment and the third compartment are superposed onto the first compartment. The second compartment and the third compartment are preferably arranged in a side-by-side arrangement superposed onto the first compartment.

The first i.e. bottom compartment preferably comprises the free flowing solid detergent composition. The second and subsequent compartments i.e. superposed compartments comprise a liquid, a solid or a mixture thereof, preferably a liquid. All compartments might comprise a gas in addition to the enclosed compositions, preferably will comprise a gas. Without wishing to be bound by theory, such a gas will create an 'air space' in the compartment and will facilitate free flowing of the enclosed compositions, and furthermore can act as an additional barrier against eventual compartment to compartment active migration through the film. Preferably the gas is air.

The water-soluble unit dose article may comprise a whitening agent. Preferably, the solid laundry detergent composition comprises the whitening agent. The solid laundry detergent composition may comprise between 0.05% and 2%, preferably between 0.1% and 1.5%, even more preferably between 0.2% and 1% by weight of the solid laundry detergent composition of the whitening agent. The whitening agent is preferably selected from a hueing dye and an optical brightener preferably an optical brightener.

The solid laundry detergent composition may comprise between 0.05% and 2%, preferably between 0.1% and 1.5%, even more preferably between 0.2% and 1% by weight of the solid laundry detergent composition of the optical brightener. The optical brightener is preferably selected from hydrophobic brighteners, stilbene brighteners, biphenyl type brighteners, or a mixture thereof, preferably selected from brightener 36, brightener 49, brightener 15 or a mixture thereof, most preferably brightener 49.

The brightener may comprise stilbenes, such as brightener 15 and brightener 36. Other suitable brighteners are hydrophobic brighteners, and biphenyl type brighteners such as brightener 49 (4,4'-bis(2-sulfostyryl)biphenyl). The brightener may be in micronized particulate form, having a weight average particle size in the range of from 3 to 30 micrometers, or from 3 micrometers to 20 micrometers, or from 3 to 10 micrometers. The brightener can be alpha or beta crystalline form.

Suitable brighteners include: di-styryl biphenyl compounds, e.g. Tinopal® CBS-X, di-amino stilbene di-sulfonic acid compounds, e.g. Tinopal® DMS pure Xtra and Blankophor® HRH, and Pyrazoline compounds, e.g. Blankophor® SN, and coumarin compounds, e.g. Tinopal® SWN.

Preferred brighteners are: sodium 2 (4-styryl-3-sulfophenyl)-2H-napthol[1,2-d]triazole, disodium 4,4'-bis{[(4-anilino-6-(N methyl-N-2 hydroxyethyl)amino 1,3,5-triazin-2-yl)]; amino}stilbene-2-2' disulfonate, disodium 4,4'-bis{[(4-anilino-6-morpholino-1,3,5-triazin-2-yl)]amino}stilbene-2-2' disulfonate, and disodium 4,4'-bis(2-sulfostyryl)biphenyl. A suitable fluorescent brightener is C.I. Fluorescent Brightener 260, which may be used in its beta or alpha crystalline forms, or a mixture of these forms.

The solid laundry detergent composition may comprise between 0.05% and 2%, preferably between 0.1% and 1.5%, even more preferably between 0.2% and 1% by weight of the solid laundry detergent composition of the hueing dye. The hueing dye may comprise polymeric or non-polymeric dyes, pigments, or mixtures thereof. Preferably the hueing dye comprises a polymeric dye, comprising a chromophore constituent and a polymeric constituent. The chromophore constituent is characterized in that it absorbs light in the wavelength range of blue, red, violet, purple, or combinations thereof upon exposure to light. In one aspect, the chromophore constituent exhibits an absorbance spectrum maximum from about 520 nanometers to about 640 nanometers in water and/or methanol, and in another aspect, from about 560 nanometers to about 610 nanometers in water and/or methanol.

Although any suitable chromophore may be used, the dye chromophore is preferably selected from benzodifuranes, methine, triphenylmethanes, napthalimides, pyrazole, napthoquinone, anthraquinone, azo, oxazine, azine, xanthene, triphenodioxazine and phthalocyanine dye chromophores. Mono and di-azo dye chromophores are preferred.

The hueing dye may comprise a dye polymer comprising a chromophore covalently bound to one or more of at least three consecutive repeat units. It should be understood that the repeat units themselves do not need to comprise a chromophore. The dye polymer may comprise at least 5, or at least 10, or even at least 20 consecutive repeat units.

The repeat unit can be derived from an organic ester such as phenyl dicarboxylate in combination with an oxyalkyleneoxy and a polyoxyalkyleneoxy. Repeat units can be derived from alkenes, epoxides, aziridine, carbohydrate including the units that comprise modified celluloses such as hydroxyalkylcellulose; hydroxypropyl cellulose; hydroxypropyl methylcellulose; hydroxybutyl cellulose; and, hydroxybutyl methylcellulose or mixtures thereof. The repeat units may be derived from alkenes, or epoxides or mixtures thereof. The repeat units may be C2-C4 alkyleneoxy groups, sometimes called alkoxy groups, preferably derived from C2-C4 alkylene oxide. The repeat units may be C2-C4 alkoxy groups, preferably ethoxy groups.

For the purposes of the present invention, the at least three consecutive repeat units form a polymeric constituent. The polymeric constituent may be covalently bound to the chromophore group, directly or indirectly via a linking group. Examples of suitable polymeric constituents include polyoxyalkylene chains having multiple repeating units. In one aspect, the polymeric constituents include polyoxyalkylene chains having from 2 to about 30 repeating units, from 2 to about 20 repeating units, from 2 to about 10 repeating units or even from about 3 or 4 to about 6 repeating units. Non-limiting examples of polyoxyalkylene chains include ethylene oxide, propylene oxide, glycidol oxide, butylene oxide and mixtures thereof.

The water-soluble unit dose article may comprise an enzyme. Preferably, the solid laundry detergent composition comprises an enzyme, preferably between 0.001% and 1%, more preferably between 0.02% and 0.5%, even more preferably between 0.003% and 0.1% by weight of the solid laundry detergent composition of the enzyme.

Preferably, the enzyme is selected from the group comprising hemicellulases, peroxidases, proteases, cellulases, xylanases, lipases, phospholipases, esterases, cutinases, pectinases, keratanases, reductases, oxidases, phenoloxidases, lipoxygenases, ligninases, pullulanases, tannases, pentosanases, malanases, β-glucanases, arabinosidases, hyaluronidase, chondroitinase, laccase, and amylases, or mixtures thereof.

A typical combination is a cocktail of conventional applicable enzymes like protease, lipase, cutinase and/or cellulase in conjunction with amylase.

A typical combination is an enzyme cocktail that may comprise, for example, a protease and lipase in conjunction with amylase. Preferably the composition comprises a lipase.

Preferred enzymes could include a protease. Suitable proteases include metalloproteases and serine proteases, including neutral or alkaline microbial serine proteases, such as subtilisins (EC 3.4.21.62). In one aspect, such suitable protease may be of microbial origin. The suitable proteases include chemically or genetically modified mutants of the aforementioned suitable proteases. In one aspect, the suitable protease may be a serine protease, such as an alkaline microbial protease or/and a trypsin-type protease. Examples of suitable neutral or alkaline proteases include:

(a) subtilisins (EC 3.4.21.62), including those derived from *Bacillus*, such as *Bacillus lentus*, *B. alkalophilus*, *B. subtilis*, *B. amyloliquefaciens*, *Bacillus pumilus* and *Bacillus gibsonii*.

(b) trypsin-type or chymotrypsin-type proteases, such as trypsin (e.g., of porcine or bovine origin), including *Fusarium* protease and chymotrypsin proteases derived from Cellumonas.

(c) metalloproteases, including those derived from *Bacillus amyloliquefaciens*.

(d) subtilisin proteases derived from the *Bacillus* sp TY-145, NCIMB 40339, especially the variants described with substitutions and/or deletions at positions 171, 173, 175 or 179.

Preferred proteases include those derived from *Bacillus gibsonii*, *Bacillus amyloliquefaciens*, *Bacillus* sp. TY-145 or *Bacillus Lentus*.

Suitable commercially available protease enzymes include those sold under the trade names Alcalase®, Savinase®, Primase®, Durazym®, Polarzyme®, Kannase®, Liquanase®, Liquanase Ultra®, Savinase Ultra®, Ovozyme®, Neutrase®, Blaze®, Everlase® and Esperase® by Novozymes A/S (Denmark), those sold under the tradename Maxatase®, Maxacal®, Maxapem®, Properase®, Purafect®, Purafect Prime®, Purafect Ox®, FN3®, FN4®, Excellase®, Ultimase®, Purafect OXP® and the Preferenz P® series by DuPont International Biosciences, those sold under the tradename Opticlean® and Optimase® by Solvay Enzymes, those available from BASF, namely BLAP (sequence shown in FIG. 29 of U.S. Pat. No. 5,352,604 with the following mutations S99D+S101R+S103A+V104I+G159S, hereinafter referred to as BLAP), BLAP R (BLAP with S3T+V4I+V199M+V205I+L217D), BLAP X (BLAP with S3T+V4I+V205I) and BLAP F49 (BLAP with S3T+V4I+A194P+V199M+V205I+L217D)–all from BASF; and KAP (*Bacillus alkalophilus* subtilisin with mutations A230V+S256G+S259N) from Kao.

Suitable alpha-amylases include those of bacterial or fungal origin. Chemically or genetically modified mutants (variants) are included. A preferred alkaline alpha-amylase is derived from a strain of *Bacillus*, such as *Bacillus licheniformis*, *Bacillus amyloliquefaciens*, *Bacillus stearothermophilus*, *Bacillus subtilis*, or other *Bacillus* sp., such as *Bacillus* sp. NCIB 12289, NCIB 12512, NCIB 12513, DSM 9375, DSM 12368, DSMZ no. 12649, KSM AP1378, KSM K36 or KSM K38. Preferred amylases include:

(a) the variants described in WO 94/02597, WO 94/18314, WO96/23874 and WO 97/43424, especially the variants with substitutions in one or more of the following positions versus the enzyme listed as SEQ ID No. 2 in WO 96/23874: 15, 23, 105, 106, 124, 128, 133, 154, 156, 181, 188, 190, 197, 202, 208, 209, 243, 264, 304, 305, 391, 408, and 444.

(b) the variants described in U.S. Pat. No. 5,856,164 and WO99/23211, WO 96/23873, WO00/60060 and WO 06/002643, especially the variants with one or more substitutions in the following positions versus the AA560 enzyme listed as SEQ ID No. 12 in WO 06/002643:

26, 30, 33, 82, 37, 106, 118, 128, 133, 149, 150, 160, 178, 182, 186, 193, 203, 214, 231, 256, 257, 258, 269, 270, 272, 283, 295, 296, 298, 299, 303, 304, 305, 311, 314, 315, 318, 319, 339, 345, 361, 378, 383, 419, 421, 437, 441, 444, 445, 446, 447, 450, 461, 471, 482, 484, preferably that also contain the deletions of D183* and G184*.

(c) variants exhibiting at least 85%, preferably 90% identity with SEQ ID No. 4 in WO06/002643, the wild-type enzyme from *Bacillus* SP722, especially variants with deletions in the 183 and 184 positions and variants described in WO 00/60060, WO11/100410 and WO13/003659, particularly those with one or more substitutions at the following positions versus SEQ ID No. 4 in WO06/002643:

51, 52, 54, 109, 304, 140, 189, 134, 195, 206, 243, 260, 262, 284, 347, 439, 469, 476 and 477.

(d) variants exhibiting at least 95% identity with the wild-type enzyme from *Bacillus* sp.707 (SEQ ID NO:7 in U.S. Pat. No. 6,093,562), especially those comprising one or more of the following mutations M202, M208, S255, R172, and/or M261. Preferably said amylase comprises one or more of M202L, M202V, M202S, M202T, M202I, M202Q, M202W, S255N and/or R172Q. Particularly preferred are those comprising the M202L or M202T mutations.

(e) variants described in WO 09/149130, preferably those exhibiting at least 90% identity with SEQ ID NO: 1 or SEQ ID NO:2 in WO 09/149130, the wild-type enzyme from *Geobacillus* Stearophermophilus or a truncated version thereof.

(f) variants described in WO10/115021, especially those exhibiting at least 75%, or at least 85% or at least 90% or at least 95% with SEQ ID NO:2 in WO10/115021, the alpha-amylase derived from *Bacillus* sp. TS-23.

Suitable commercially available alpha-amylases include DURAMYL®, LIQUEZYME®, TERMAMYL®, TERMAMYL ULTRA®, NATALASE®, SUPRAMYL®, STAINZYME®, STAINZYME PLUS®, EVEREST®, FUNGAMYL® and BAN® (Novozymes A/S, Bagsvaerd, Denmark), KEMZYM® AT 9000 Biozym Biotech Trading GmbH Wehlistrasse 27b A-1200 Wien Austria, RAPIDASE®, PURASTAR®, ENZYSIZE®, OPTISIZE HT PLUS®, POWERASE® and PURASTAR OXAM®, PREFERENZ® S series, including PREFERENZ S1000 and PREFERENZ S110 (DuPont Industrial Biosciences, Palo Alto, Calif.) and KAM® (Kao, 14-10 Nihonbashi Kayabacho, 1-chome, Chuo-ku Tokyo 103-8210, Japan). In one aspect, suitable amylases include NATALASE®, EVEREST®, PREFERENZ S1000®, STAINZYME® and STAINZYME PLUS® and mixtures thereof.

In one aspect, such enzymes may be selected from the group consisting of: lipases, including "first cycle lipases". In one aspect, the lipase is a first-wash lipase, preferably a variant of the wild-type lipase from *Thermomyces lanuginosus* comprising one or more of the T231R and N233R mutations. The wild-type sequence is the 269 amino acids (amino acids 23-291) of the Swissprot accession number Swiss-Prot O59952 (derived from *Thermomyces lanuginosus* (*Humicola lanuginosa*)). Preferred first cycle lipases include those with mutations at one or more of the following positions: 27, 38, 58, 60, 83, 96, 111, 150, 163, 227, 231, 233, 254, 255 and 256. Further preferred lipase variants have a net charge that is more positive than the wild-type lipase. The net charge can be calculated by assigning a charge of −1 to the anionic groups (D and E) and a net charge of +1 to the cationic groups (R and K) and comparing to the wild-type. Preferred mutations include D27R, G38A, G91A, D96G, D96E, D111A, G163K, G225R, T231R, N233R, D254S, P256T, S58A, V60S, S83T, A150G, L227G, I255A and/or P256K. Preferred variants include those with mutations:

(a) T231R+N233R;
(b) D27R+G38A+D96E+D111A+G163K+T231R+N233R+D254S+P256T
(c) G91A+D96G+G225R+T231R+N233R Preferred lipases would include those sold under the tradenames Lipex®, Lipoclean®, Calipso® and Lipolex®.

In one aspect, other preferred enzymes include fungal and microbial-derived endoglucanases exhibiting endo-beta-1,4-glucanase activity (E.C. 3.2.1.4), including a bacterial polypeptide endogenous to a member of the genus *Bacillus* which has a sequence of at least 90%, 94%, 97% and even 99% identity to the amino acid sequence SEQ ID NO:2 in U.S. Pat. No. 7,141,403B2) and mixtures thereof. Suitable endoglucanases are sold under the tradenames Celluclean®, Carezyme®, Celluzyme®, Carezyme Premium® and Whitezyme® (Novozymes A/S, Bagsvaerd, Denmark).

Other preferred enzymes include pectate lyases sold under the tradenames Pectawash®, Pectaway®, Xpect® and mannanases sold under the tradenames Mannaway® (all from Novozymes A/S, Bagsvaerd, Denmark), and Preferenz F® and Purabrite® (DuPont International Biosciences, Palo Alto, Calif.).

Deoxyribonuclease (DNase): Suitable deoxyribonucleases (DNases) are any enzyme that catalyzes the hydrolytic cleavage of phosphodiester linkages in the DNA backbone, thus degrading DNA. According to the invention, a DNase which is obtainable from a bacterium is preferred; in particular a DNase which is obtainable from a *Bacillus* is preferred; in particular a DNase which is obtainable from *Bacillus subtilis* or *Bacillus licheniformis* is preferred.

Perhydrolases: Suitable perhydrolases are capable of catalyzing a perhydrolysis reaction that results in the production of a peracid from a carboxylic acid ester (acyl) substrate in the presence of a source of peroxygen (e.g., hydrogen peroxide). While many enzymes perform this reaction at low levels, perhydrolases exhibit a high perhydrolysis:hydrolysis ratio, often greater than 1. Suitable perhydrolases may be of plant, bacterial or fungal origin. Chemically modified or protein engineered mutants are included.

Examples of useful perhydrolases include naturally occurring *Mycobacterium* perhydrolase enzymes, or variants thereof. An exemplary enzyme is derived from *Mycobacterium smegmatis*.

Oxidases/peroxidases: Suitable oxidases and peroxidases (or oxidoreductases) include various sugar oxidases, laccases, peroxidases and haloperoxidases.

Suitable peroxidases include those comprised by the enzyme classification EC 1.11.1.7, as set out by the Nomenclature Committee of the International Union of Biochemistry and Molecular Biology (IUBMB), or any fragment derived therefrom, exhibiting peroxidase activity.

Suitable peroxidases include those of plant, bacterial or fungal origin. Chemically modified or protein engineered mutants are included. Examples of useful peroxidases include peroxidases from *Coprinopsis*, e.g., from *C. cinerea* and variants thereof.

A peroxidase for use in the invention also include a haloperoxidase enzyme, such as chloroperoxidase, bromoperoxidase and compounds exhibiting chloroperoxidase or bromoperoxidase activity. Haloperoxidases are classified according to their specificity for halide ions. Chloroperoxidases (E.C. 1.11.1.10) catalyze formation of hypochlorite from chloride ions.

The haloperoxidase may be a chloroperoxidase. Preferably, the haloperoxidase is a vanadium haloperoxidase, i.e., a vanadate-containing haloperoxidase. In a preferred method of the present invention the vanadate-containing haloperoxidase is combined with a source of chloride ion.

Haloperoxidases have been isolated from many different fungi, in particular from the fungus group dematiaceous hyphomycetes, such as Caldariomyces, e.g., *C. fumago*, *Alternaria*, *Curvularia*, e.g., *C. verruculosa* and *C. inaequalis*, *Drechslera*, *Ulocladium* and *Botrytis*. Haloperoxidases have also been isolated from bacteria such as *Pseudomonas*, e.g., *P. pyrrocinia* and *Streptomyces*, e.g., *S. aureofaciens*.

Preferably, the haloperoxidase is derivable from *Curvularia* sp., in particular *Curvularia verruculosa* or *Curvularia inaequalis*, such as *C. inaequalis* CBS 102.42 6; or *C. verruculosa* CBS 147.63 or *C. verruculosa* CBS 444.70; or from *Drechslera hartlebii*, *Dendryphiella salina*, *Phaeotrichoconis crotalarie*, or *Geniculosporium sp*.

An oxidase according to the invention include, in particular, any laccase enzyme comprised by the enzyme classification EC 1.10.3.2, or any fragment derived therefrom exhibiting laccase activity, or a compound exhibiting a similar activity, such as a catechol oxidase (EC 1.10.3.1), an o-aminophenol oxidase (EC 1.10.3.4), or a bilirubin oxidase (EC 1.3.3.5).

Preferred laccase enzymes are enzymes of microbial origin. The enzymes may be derived from plants, bacteria or fungi (including filamentous fungi and yeasts).

Suitable examples from fungi include a laccase derivable from a strain of *Aspergillus*, *Neurospora*, e.g., *N. crassa*, *Podospora*, *Botrytis*, *Collybia*, *Fomes*, *Lentinus*, *Pleurotus*, *Trametes*, e.g., *T. villosa* and *T. versicolor*, *Rhizoctonia*, e.g.,

*R. solani, Coprinopsis*, e.g., *C. cinerea, C. comatus, C. friesii*, and *C. plicatilis, Psathyrella*, e.g., *P. condelleana, Panaeolus*, e.g., *P. papilionaceus, Myceliophthora*, e.g., *M. thermophila, Schytalidium*, e.g., *S. thermophilum*, Polyporus, e.g., *P. pinsitus, Phlebia*, e.g., *P. radiata* or *Coriolus*, e.g., *C. irsutus*). Suitable examples from bacteria include a laccase derivable from a strain of *Bacillus*. A laccase derived from *Coprinopsis* or *Myceliophthora* is preferred; in particular a laccase derived from *Coprinopsis cinerea*; or from *Myceliophthora thermophila*.

Examples of other oxidases include, but are not limited to, amino acid oxidase, glucose oxidase, lactate oxidase, galactose oxidase, polyol oxidase and aldose oxidase. Oxidases and their corresponding substrates may be used as hydrogen peroxide generating enzyme systems, and thus a source of hydrogen peroxide. Several enzymes, such as peroxidases, haloperoxidases and perhydrolases, require a source of hydrogen peroxide. By studying EC 1.1.3._, EC 1.2.3._, EC 1.4.3._, and EC 1.5.3._ or similar classes (under the International Union of Biochemistry), other examples of such combinations of oxidases and substrates are easily recognized by one skilled in the art.

The water-soluble unit dose article preferably comprises a stain removal active selected from a chelant, an acrylate/maleate random copolymer or a mixture thereof. Preferably, the solid laundry detergent composition comprises a stain removal active selected from a chelant, an acrylate/maleate random copolymer or a mixture thereof. Preferably, the solid laundry detergent composition comprises between 0.5% and 15%, preferably between 1% and 12.5%, even more preferably between 1.5% and 10% by weight of the solid laundry detergent composition of the acrylate/maleate random copolymer. Preferably, the solid laundry detergent composition comprises between 1% and 20%, preferably between 5% and 17.5%, even more preferably between 10% and 15% by weight of the solid laundry detergent composition of the chelant.

The chelant is preferably selected from amino carboxylates, amino phosphonates, polyfunctionally-substituted aromatic chelating agents and mixtures thereof. Preferably, the chelant is selected from the group consisting of glutamic-N,N-diacetic acid (GLDA), Diethylenetriamine penta methylphosphonic acid (DTPMP), 1-hydroxyethane 1,1-diphosphonic acid (HEDP), ethylenediaminetetra-acetates (EDTA), N-hydroxyethylethylenediaminetriacetates, nitrilotriacetates (NTA), ethylenediamine tetrapro-prionates, triethylenetetraaminehexacetates, diethylenetriaminepentaacetates, aspartic acid-N-monoacetic acid (ASMA), aspartic acid-N,N-diacetic acid (ASDA), aspartic acid-N-monopropionic acid (ASMP), iminodisuccinic acid (IDS), Imino diacetic acid (IDA), N-(2-sulfomethyl) aspartic acid (SMAS), N-(2-sulfoethyl) aspartic acid (SEAS), N-(2-sulfomethyl) glutamic acid (SMGL), N-(2-sulfoethyl) glutamic acid (SEGL), N-methyliminodiacetic acid (MIDA), alanine-N,N-diacetic acid (ALDA), serine-N,N-diacetic acid (SEDA), isoserine-N,N-diacetic acid (ISDA), phenylalanine-N,N-diacetic acid (PHDA), anthranilic acid-N,N-diacetic acid (ANDA), sulfanilic acid-N,N-diacetic acid (SLDA), taurine-N,N-diacetic acid (TUDA) and sulfomethyl-N,N-diacetic acid (SMDA), ethylenediamine disuccinate ("EDDS"), Hydroxyethyleneiminodiacetic acid, Hydroxyiminodisuccinic acid, Hydroxyethylene diaminetriacetic acid, or a mixture thereof. More preferably, the chelant is selected from the group consisting of glutamic-N,N-diacetic acid (GLDA), and derivatives thereof, and/or Diethylenetriamine penta methylphosphonic acid (DTPMP), 1-hydroxyethane 1,1-diphosphonic acid (HEDP), and derivatives thereof, and mixtures thereof.

Preferably, the acrylate/maleate random copolymer has a molecular weight of from 50,000 Da to 100,000 Da, preferably from 60,000 Da to 80,000 Da.

The water-soluble unit dose article may comprise a cationically modified polysaccharide. Preferably, the solid laundry detergent composition comprises the cationically modified polysaccharide. More preferably, the cationically modified polysaccharide is selected from cationic guar gums, cationic cellulosic polymers, and mixtures thereof, most preferably cationic cellulosic polymers.

The solid laundry detergent composition preferably comprises between 0.05% and 5%, preferably between 0.1% and 4%, preferably between 0.2% and 3%, more preferably between 0.25% and 2% by weight of the solid laundry detergent composition of the cationically modified polysaccharide.

Preferably the cationically modified cellulose polymer is selected from cationically modified hydroxyethyl cellulose, cationically modified hydroxypropyl cellulose, cationically and hydrophobically modified hydroxyethyl cellulose, cationically and hydrophobically modified hydroxypropyl cellulose, or a mixture thereof, more preferably cationically modified hydroxyethyl cellulose, cationically and hydrophobically modified hydroxyethyl cellulose, or a mixture thereof.

By "cationically modified" we herein mean that one or more cationically charged groups are bound to the polymer.

The cationically modified hydroxyethyl cellulose preferably is hydroxyethyl cellulose derivatised with trimethyl ammonium substituted epoxide.

The cationic guar gum may comprise guar hydroxypropyl trimonium chloride

The cationically modified polysaccharide can be synthesized in, and are commercially available in, a number of different molecular weights. In order to achieve optimal softening performance from the product, it is desirable that the cationically modified polysaccharide used in this invention be of an appropriate molecular weight. Without wishing to be bound by theory, it is believed that polymers that are too high in mass can entrap soils and prevent them from being removed. The use of cationically modified polysaccharide with an average molecular weight of less than 1,250,000 daltons, or with an average molecular weight of less than 850,000 daltons, and especially those with an average molecular weight of less than 500,000 daltons can help to minimise this effect without significantly reducing the softening performance of properly formulated products. On the other hand, polymers with a molecular weight of about 10,000 daltons or less are believed to be too small to give an effective softening benefit. Therefore the cationic polymer according to the invention preferably has a molecular weight of from about 10,000 daltons to about 1,250,000 daltons, preferably from about 30,000 daltons to about 850,000 daltons, more preferably from about 50,000 daltons to about 750,000 daltons, even more preferably from about 100,000 daltons to about 600,000 daltons, most preferably from about 200,000 daltons to about 500,000 daltons.

The cationically modified polysaccharide may also have a cationic charge density ranging from about 0.1 meq/g to about 5 meq/g, preferably from about 0.12 meq/g to about 4 meq/g, more preferably from about 0.14 meq/g to about 2.5 meq/g, even more preferably from about 0.16 meq/g to about 1.5 meq/g, most preferably from about 0.18 meq/g to about 0.7 meq/g, at the pH of intended use of the laundry composition. As used herein the "charge density" of the cationic polymers is defined as the number of cationic sites per polymer gram atomic weight (molecular weight), and can be expressed in terms of meq/gram of cationic charge. In general, adjustments of the proportions of amine or quaternary ammonium moieties in the polymer in function of the pH of the liquid laundry formulation in the case of amines, will affect the charge density. Without intending to be bound by theory, cationic polymers with a too high charge density are thought to be too sensitive to precipitate out with anionic compounds in the formulation, while cationic polymers with a too low charge density are thought to have a too low affinity to fabrics, compromising softness accordingly. Any anionic counterions can be used in association with cationic polymers. Non-limiting examples of such counterions include halides (e.g. chlorine, fluorine, bromine, iodine), sulphate and methylsulfate, preferably halides, more preferably chlorine.

The cationically modified polysaccharide might be "hydrophobically modified". We herein mean that one or more hydrophobic groups are bound to the polymer. Without intending to be bound by theory we believe that hydrophobic modification can increase the affinity of the polymer towards the fabric. Without intending to be limiting, the one or more hydrophobic groups can be independently selected from $C_1$-$C_{32}$ preferably $C_5$-$C_{32}$ alkyl; $C_1$-$C_{32}$ preferably $C_5$-$C_{32}$ substituted alkyl, $C_5$-$C_{32}$ alkylaryl, or $C_5$-$C_{32}$ substituted alkylaryl, (poly)alkoxy $C_1$-$C_{32}$ preferably $C_5$-$C_{32}$ alkyl or (poly)alkoxy substituted $C_1$-$C_{32}$ preferably $C_5$-$C_{32}$ alkyl or mixtures thereof. Hydrophobic substitution on the polymer, preferably on the anhydroglucose rings or alternatively on the nitrogen of the cationic substitution of the cationic polymer may range from 0.01% to 5% per glucose unit, more preferably from 0.05% to 2% per glucose unit, of the polymeric material.

Those skilled in the art will be aware of ways to make the cationically modified polysaccharide using conventional chemical techniques. The cationically modified polysaccharide may be lightly cross-linked with a dialdehyde, such as glyoxal, to prevent forming lumps, nodules or other agglomerations when added to water at ambient temperatures.

The cationically modified polysaccharide include those which are commercially available and further include materials which can be prepared by conventional chemical modification of commercially available materials. Commercially available cationically modified polysaccharides include those with the INCI name Polyquaternium 10, such as those sold under the trade names: Ucare Polymer JR 30M, JR 400a, JR 125, LR 400 and LK 400 polymers; Polyquaternium 67 such as those sold under the trade name Softcat SK™, all of which are marketed by Amerchol Corporation, Edgewater N.J.; and Polyquaternium 4 such as those sold under the trade name: Celquat H200 and Celquat L-200, available from National Starch and Chemical Company, Bridgewater, N.J. Other suitable polysaccharides include hydroxyethyl cellulose or hydoxypropylcellulose quaternized with glycidyl $C_{12}$-$C_{22}$ alkyl dimethyl ammonium chloride. Examples of such polysaccharides include the polymers with the INCI names Polyquaternium 24 such as those sold under the trade name Quaternium LM 200 by Amerchol Corporation, Edgewater N.J. Commercially available guar gums include the N-HANCE series from the Ashland Corporation.

The water-soluble unit dose article may comprise a capsule wherein the capsule comprises a shell and a core wherein the core comprises a perfume.

Preferably, the solid laundry detergent composition comprises a capsule, wherein the capsule comprises a shell and a core wherein the core comprises a perfume.

Those skilled in the art will be aware of ways to make such capsules using techniques commonly known in the art.

Preferably, the capsule is in the form of an agglomerate or a spray-dried particle.

A perfume microcapsule composition in the form of an agglomerate can be used. Such agglomerate may be made by any suitable agglomerating technique.

For the addition of the capsule by spray drying, spray drying processes for forming detergent compositions are well known in the art and typically involve the steps of forming a detergent slurry, often warmed to 60-80° C. using at least in part heat of anionic surfactant neutralization (e.g. neutralization of linear alkyl benzene sulphonic acid). The slurry has typically a water content of between 30%-60% and may comprise a builder, a neutralized or acid-form anionic surfactant, a nonionic surfactant, a neutralizing alkali such as soda ash or sodium carbonate, an inorganic salt or salts such as sodium sulphate, water, processing aids, and organic polymers in a crutcher. The detergent slurry is pumped to the top of a spray drying tower, and sprayed from nozzles in the tower to form atomized droplets.

These compositions can also be prepared by continuous slurry making. By continuous slurry making is meant a process in which components are fed continuously and substantially simultaneously to a slurry making vessel while mixed, the slurry is removed to the spray tower at a rate which maintains an essentially constant volume in the vessel. Hot air is pumped through the spray drying towers such that when the atomized droplets are sprayed into the hot air, they dry into a solid as the free moisture evaporates. The spray-dried granules thus formed are then collected at the bottom of the tower.

Preferably, the solid laundry detergent composition comprises between 0.05% and 10%, preferably between 0.1% and 7.5%, more preferably between 0.15% and 5%, most preferably between 0.2% and 2.5% by weight of the liquid laundry detergent composition of the perfume. Any suitable perfume may be used. Those skilled in the art will be aware of suitable perfumes to be encapsulated in the capsule.

Preferably, the shell material comprises polyacrylate, aminoplast, polyacrylamide, silicones, silica, polystyrene, polyurea, polyurethanes, resorcinol, gelatin, polyamides, or mixtures thereof, preferably aminoplast, polyacrylate or a mixture thereof.

Preferably the shell material comprises an aminoplast. The aminoplast may comprise a polyurea, polyurethane, and/or polyureaurethane. The aminoplast may comprise an aminoplast copolymer, such as melamine-formaldehyde, urea-formaldehyde, cross-linked melamine formaldehyde, or mixtures thereof. Preferably the shell comprises an aminoplast wherein the aminoplast is melamine formaldehyde.

Preferably, the shell material comprises a material selected from the group consisting of a polyacrylate, a polyethylene glycol acrylate, a polyurethane acrylate, an epoxy acrylate, a polymethacrylate, a polyethylene glycol methacrylate, a polyurethane methacrylate, an epoxy methacrylate, and mixtures thereof. The shell material may comprise a polyacrylate polymer. The shell may comprise from about 50% to about 100%, or from about 70% to about 100%, or from about 80% to about 100% of a polyacrylate polymer. The polyacrylate may comprise a polyacrylate cross linked polymer.

Preferably, the shell material comprises a polymer derived from a material that comprises one or more multifunctional acrylate moieties. The multifunctional acrylate moiety may be selected from the group consisting of tri-functional acrylate, tetra-functional acrylate, penta-functional acrylate, hexa-functional acrylate, hepta-functional acrylate and mixtures thereof. Preferably the shell material comprises a polyacrylate that comprises a moiety selected from the group consisting of an amine acrylate moiety, methacrylate moiety, a carboxylic acid acrylate moiety, carboxylic acid methacrylate moiety, and combinations thereof.

Preferably the shell material may include a material that comprises one or more multifunctional acrylate and/or methacrylate moieties. The ratio of material that comprises one or more multifunctional acrylate moieties to material that comprises one or more methacrylate moieties may be from about 99:1 to about 6:4, or from about 99:1 to about 8:1, or from about 99:1 to about 8.5:1. The multifunctional acrylate moiety may be selected from the group consisting of tri-functional acrylate, tetra-functional acrylate, penta-functional acrylate, hexa-functional acrylate, hepta-functional acrylate and mixtures thereof. Preferably the shell material may include a polyacrylate that comprises a moiety selected from the group consisting of an amine acrylate moiety, methacrylate moiety, a carboxylic acid acrylate moiety, carboxylic acid methacrylate moiety and combinations thereof.

Polystyrene shell material may comprise polyestyrene cross-linked with divinylbenzene. Said polyurea shell material may comprise urea crosslinked with formaldehyde, urea crosslinked with gluteraldehyde, and mixtures thereof.

The polyurea shell may comprise a polyurea which is preferably the reaction product of the polymerisation between at least one polyisocyanate comprising at least two isocyanate functional groups and at least one amine.

The core/polyacrylate shell encapsulate may comprise an emulsifier, wherein the emulsifier is preferably selected from anionic emulsifiers, nonionic emulsifiers, cationic emulsifiers or mixtures thereof, preferably nonionic emulsifiers.

The core/polyacrylate shell encapsulate may comprise from 0.1% to 1.1% by weight of the core/shell encapsulate of polyvinyl alcohol. Preferably, the polyvinyl alcohol has at least one the following properties, or a mixture thereof:

(i) a hydrolysis degree from 55% to 99%;
(ii) a viscosity of from 40 mPa·s to 120 mPa·s in 4% water solution at 20° C.;
(iii) a degree of polymerization of from 1,500 to 2,500;
(iv) number average molecular weight of from 65,000 Da to 110,000 Da.

The polyacrylate core of the core/shell encapsulate may comprise greater than 10% by weight of the core of a partitioning modifier. Preferably, the portioning modifier comprises a material selected from the group consisting of propan-2-yl tetradecanoate, vegetable oil, modified vegetable oil and mixtures thereof. Preferably, said modified vegetable oil is esterified and/or brominated. Preferably said partitioning modifier comprises propan-2-yl tetradecanoate.

The capsule may be coated with a deposition aid, a cationic polymer, a non-ionic polymer, an anionic polymer, or mixtures thereof. Suitable polymers may be selected from the group consisting of: polyvinylformaldehyde, partially hydroxylated polyvinylformaldehyde, polyvinylamine, polyethyleneimine, ethoxylated polyethyleneimine, polyvinylalcohol, chitosan and chitosan derivatives and combinations thereof.

Water-Soluble Film

The film of the present invention is soluble or dispersible in water. The water-soluble film preferably has a thickness of from 20 to 150 micron, preferably 35 to 125 micron, even more preferably 50 to 110 micron, most preferably about 76 micron.

Preferably, the film has a water-solubility of at least 50%, preferably at least 75% or even at least 95%, as measured by the method set out here after using a glass-filter with a maximum pore size of 20 microns:

5 grams±0.1 gram of film material is added in a pre-weighed 3 L beaker and 2 L±5 ml of distilled water is added. This is stirred vigorously on a magnetic stirrer, Labline model No. 1250 or equivalent and 5 cm magnetic stirrer, set at 600 rpm, for 30 minutes at 30° C. Then, the mixture is filtered through a folded qualitative sintered-glass filter with a pore size as defined above (max. 20 micron). The water is dried off from the collected filtrate by any conventional method, and the weight of the remaining material is determined (which is the dissolved or dispersed fraction). Then, the percentage solubility or dispersability can be calculated.

Preferred film materials are preferably polymeric materials. The film material can, for example, be obtained by casting, blow-moulding, extrusion or blown extrusion of the polymeric material, as known in the art.

Preferred polymers, copolymers or derivatives thereof suitable for use as pouch material are selected from polyvinyl alcohols, polyvinyl pyrrolidone, polyalkylene oxides, acrylamide, acrylic acid, cellulose, cellulose ethers, cellulose esters, cellulose amides, polyvinyl acetates, polycarboxylic acids and salts, polyaminoacids or peptides, polyamides, polyacrylamide, copolymers of maleic/acrylic acids, polysaccharides including starch and gelatine, natural gums such as xanthum and carragum. More preferred polymers are selected from polyacrylates and water-soluble acrylate copolymers, methylcellulose, carboxymethylcellulose sodium, dextrin, ethylcellulose, hydroxyethyl cellulose, hydroxypropyl methylcellulose, maltodextrin, polymethacrylates, and most preferably selected from polyvinyl alcohols, polyvinyl alcohol copolymers and hydroxypropyl methyl cellulose (HPMC), and combinations thereof. Preferably, the level of polymer in the pouch material, for example a PVA polymer, is at least 60%. The polymer can have any weight average molecular weight, preferably from about 1000 to 1,000,000, more preferably from about 10,000 to 300,000 yet more preferably from about 20,000 to 150,000.

Mixtures of polymers and/or copolymers can also be used as the pouch material, especially mixtures of polyvinylalcohol polymers and/or copolymers, especially mixtures of polyvinylalcohol homopolymers and/or anionic polyvinylalcohol copolymers preferably selected from sulphonated and carboxylated anionic polyvinylalcohol copolymers especially carboxylated anionic polyvinylalcohol copolymers. Most preferably the water soluble film comprises a blend of a polyvinylalcohol homopolymer and a carboxylated anionic polyvinylalcohol copolymer.

Preferred films exhibit good dissolution in cold water, meaning unheated distilled water. Preferably such films exhibit good dissolution at temperatures of 24° C., even more preferably at 10° C. By good dissolution it is meant that the film exhibits water-solubility of at least 50%, preferably at least 75% or even at least 95%, as measured by the method set out here after using a glass-filter with a maximum pore size of 20 microns, described above.

Preferred films are those supplied by Monosol under the trade references M8630, M8900, M8779, M8310.

The film may be opaque, transparent or translucent. The film may comprise a printed area.

The area of print may be achieved using standard techniques, such as flexographic printing or inkjet printing.

The film may comprise an aversive agent, for example a bittering agent. Suitable bittering agents include, but are not limited to, naringin, sucrose octaacetate, quinine hydrochloride, denatonium benzoate, or mixtures thereof. Any suitable level of aversive agent may be used in the film. Suitable levels include, but are not limited to, 1 to 5000 ppm, or even 100 to 2500 ppm, or even 250 to 2000 rpm.

Solid Laundry Detergent Composition

The first internal compartment comprises a solid laundry detergent composition. The solid laundry detergent composition may comprise solid particulates or may be a single homogenous solid. Preferably, the solid laundry detergent composition comprises particles. This means the solid laundry detergent composition comprises individual solid particles as opposed to the solid being a single homogenous solid. The particles may be free-flowing or may be compacted, preferably free-flowing.

The particles may be spray-dried particles, agglomerates, extrudates or a mixture thereof. Those skilled in the art will know how to make spray-dried particles, agglomerates or extrudates using techniques commonly known in the art.

The solid particulate laundry detergent composition preferably has a mean particle size of between 400 microns and 1000 microns, more preferably between 450 microns and 850 microns.

Preferably, the solid particulate laundry detergent composition has a bulk density of between 400 and 1000 g/l, more preferably between 500 and 800 g/l, as measured through ISO 697 test method.

Preferably, the solid particulate laundry detergent composition fills between 25% and 95%, preferably between 30% and 90%, more preferably between 40% and 80% of the available volume within the first compartment, the remaining volume preferably filled with a gas. The gas may be any suitable gas. The gas may comprise oxygen, nitrogen, carbon dioxide or a mixture thereof. The gas may be air.

The first compartment preferably comprises between 1 g and 25 g, preferably between 5 g and 20 g, more preferably between 8 g and 18 g of the solid particulate laundry composition.

The solid particulate laundry detergent composition is preferably free flowing within the first internal compartment. That is to say, if the water-soluble unit dose article is moved or repositioned, the solid particulate laundry detergent composition can be seen to freely move, or flow within the first internal compartment. This is opposed to where the solid particulate laundry detergent composition is compressed such as happens when excess air is drawn out of the first internal compartment so that the film contracts and compresses around the solid particulate laundry detergent composition. Such water-soluble unit dose articles comprising compressed solids are commonly known from the art.

The solid laundry detergent composition comprises a non-soap surfactant. Preferably, the solid laundry detergent composition comprises between 20% and 75%, more preferably between 30% and 70%, most preferably between 40% and 60% by weight of the solid laundry detergent composition of the non-soap surfactant The non-soap surfactant may comprise a non-soap anionic surfactant, a non-ionic surfactant or a mixture thereof, preferably a non-soap anionic surfactant. The solid composition may comprise a non-soap anionic surfactant, preferably, the solid laundry detergent composition comprises between 20% and 75%, more preferably between 30% and 70%, most preferably between 40% and 60% by weight of the solid laundry detergent composition of the non-soap anionic surfactant.

Preferably, the non-soap anionic surfactant comprises linear alkylbenzene sulphonate, alkoxylated alkyl sulphate or a mixture thereof, more preferably a mixture thereof. Preferably, the ratio of linear alkylbenzene sulphonate to alkoxylated alkyl sulphate preferably the ratio of linear alkylbenzene sulphonate to ethoxylated alkyl sulphate is from 1:2 to 20:1, preferably from 1.1:1 to 15:1, more preferably from 1.2:1 to 10:1, even more preferably from 1.3:1 to 5:1, even more preferably from 1.4:1 to 3:1, most preferably from 2:1 to 3:1.

Preferably, the alkoxylated alkyl sulphate is an ethoxylated alkyl sulphate with an average degree of ethoxylation of between 0.5 and 7, preferably between 0.5 and 5, more preferably between 0.5 and 3, even more preferably from about 1 to about 2 most preferably 1 and an average alkyl chain length of between 8 and 18. Preferably the alkoxylated alkyl sulphate has an average alkyl chain length between 10 and 16, more preferably between 12 and 14. Preferably, the linear alkylbenzene sulphonate is a $C_{10}$-$C_{16}$ linear alkylbenzene sulphonate or a $C_{11}$-$C_{14}$ linear alkylbenzene sulphonate or a mixture thereof.

When present, preferably the non-ionic surfactant is selected from an alkoxylated alcohol preferably selected from a natural or olefin derived fatty alcohol alkoxylate, an oxo-synthesised fatty alcohol alkoxylate, Guerbet fatty alcohol alkoxylates, alkyl phenol alcohol alkoxylates or a mixture thereof. The alcohol alkoxylate may have an average degree of alkoxylation of between 0.5 and 10, preferably between 1 and 9, more preferably between 3 and 8, more preferably a degree of ethoxylation of between 0.5 and 10, preferably between 1 and 9, more preferably between 3 and 8, most preferably between 5 and 8 or even from about 7 to about 8. The alcohol alkoxylate may have an average alkyl chain length of between 8 and 18, preferably between 10 and 16, more preferably between 12 and 15.

The solid composition at 1 wt % dilution in deionized water at 20° C. has an equilibrium pH in the range of from 6.5 to 8.8, preferably between 6.7 and 8.5, more preferably between 7 and 8. Without wishing to be bound by theory, the specific low pH of the solid laundry detergent composition provides for improved fabric cleaning or treatment performance of the water-soluble unit dose article according to the present invention as compared to water-soluble unit dose articles wherein the solid laundry detergent composition has a higher pH. Such higher pH solid laundry detergent composition formulated into water-soluble unit dose articles are known in the art.

Those skilled in the art will know how to measure the pH using common known techniques. A preferred method is to obtain a 10 g sample accurately weighed to two decimal places, of the solid laundry detergent composition. The sample should preferably be obtained using a Pascall sampler in a dust cabinet. Add the 10 g sample to a plastic beaker and add 200 ml of carbon dioxide-free de-ionised water. Agitate using a magnetic stirrer on a stirring plate at 150 rpm until fully dissolved and for at least 15 minutes. Transfer the contents of the beaker to a 1 litre volumetric flask and make up to 1 litre with Cardon dioxide-free de-ionised water. Mix well and take a 100 mls±1 ml aliquot using a 100 mls pipette immediately. Measure and record the pH and temperature of the sample using a pH meter capable of reading to ±0.01 pH units, with stirring, ensuring temperature is 20° C.+/−0.5° C.

The solid laundry detergent composition may comprise between 0% and 10% by weight of the solid laundry detergent composition of carbonate salts. The carbonate salts may be selected from sodium carbonate, potassium carbonate, sodium bicarbonate, sodium bicarbonate, burkeite, sequicarbonate, habit modified carbonate, crystal growth modified burkeite or a mixture thereof, preferably sodium carbonate.

The solid laundry detergent composition may comprise a material selected from zeolite, sodium sulphate, silica, organic acid or a mixture thereof, preferably wherein the solid laundry detergent composition comprises between 10% and 35%, more preferably between 12% and 25% by weight of the solid laundry detergent composition of the material.

The solid laundry detergent composition may comprise an organic acid, preferably between 1% and 10% by weight of the solid laundry detergent composition of an organic acid and/or a salt thereof. Preferably, the organic acid is a carboxylic acid, preferably a polycarboxylic acid, more preferably the organic acid is selected from citric acid, malic acid, lactic acid, propionic acid, valeric acid, caproic acid, carbonic acid, adipic acid, gluconic acid, methylglycinediacetic acid or a mixture thereof, most preferably citric acid. Without wishing to be bound by theory such materials may be used to control the pH of the laundry detergent composition.

The solid laundry detergent composition may comprise an adjunct ingredient, wherein the adjunct ingredient is preferably selected from polyester terephthalate polymers, PEG-based polymers, ethoxylated polyethyleneimines, polysaccharides, amine oxide, aesthetic dyes, hueing dyes, antifoams, bleaching actives, or a mixture thereof.

Preferably, the particulate laundry detergent composition comprises agglomerates. Preferably, the agglomerates comprise non-soap surfactant, sodium sulphate and silica.

Another aspect of the present invention is the use of a solid laundry detergent composition comprising a non-soap surfactant and having at 1 wt % dilution in deionized water at 20° C. an equilibrium pH in the range of from 6.5 to 8.8 in a water-soluble unit dose article as according to the present invention to improve the performance of an optical brightener.

Method of Washing

An aspect of the present invention is a method of washing comprising the steps of adding the water-soluble unit dose article according to the present invention to sufficient water to dilute the solid particulate laundry detergent composition by a factor of at least 300 fold to create a wash liquor and contacting fabrics to be washed with said wash liquor.

The method may be performed in a hand wash operation, an automatic laundry washing machine or a mixture thereof.

Process of Making

Those skilled in the art will know how to make the unit dose article and particulate laundry detergent composition of the present invention using known techniques in the art:

Water Soluble Pouch Making:

During manufacture, a first water-soluble film may be shaped to comprise an open compartment into which the detergent composition is added. A second water-soluble film is then laid over the first film in such an orientation as to close the opening of the compartment. The first and second films are then sealed together along a seal region using known sealing means such as solvent, heat or a mixture thereof.

Preparation of Free-Flowing Detergent Powders:

Highly preferred are free-flowing detergent powders. Without wishing to be bound by theory, free-flowing detergent powders are found to have improved dissolution when formulated in a water soluble pouch compared to compressed powders, leaving less detergent residues behind accordingly. Highly free-flowing detergent powders can be prepared by the following process.

Surfactant-containing particles can be prepared by spray-drying, agglomeration or other processes such as drum drying etc. Such agglomerates are preferred due to the high surfactant loading that can be achieved. However other processes can be used. The surfactant agglomerates preferably contain anionic surfactant, including LAS. An especially preferred feature is that the surfactant agglomerates contain a mixture of anionic surfactants, especially LAS and AES surfactant.

To improve the flowability and stability of the detergent powder(s), smaller particles are usually removed by sieving. It is especially preferred to sieve the surfactant agglomerates plus other detergent ingredients prior to any subsequent coating step. The surfactant agglomerates, plus other granular detergent ingredients such as HEDP, are sieved to remove particles smaller than 600 microns. The surfactant particles, plus any other detergent ingredients that are optionally added, are then put into a mixer where they are dusted or coated with a fine powder to provide a protective layer on the surface. An example of such a process is where blown powders are coated with non-ionic surfactant as a binder and then zeolite. It has been found, though, that dusting or coating the surfactant agglomerates (and other optional detergent ingredients) in this instance with a blend of micronized sodium sulphate and zeolite gives good results for flowability as well as appearance etc. Inclusion of a liquid binder to help the adhesion of the fine powder(s) to the surface of the larger surfactant agglomerates is also an option.

A suitable detergent mix can be prepared as follows. Surfactant agglomerates containing a blend of LAS and AExS anionic surfactants are prepared and dried to give particles with a total surfactant activity of 60% comprising a 2:1 blend of LAS to AExS surfactants. The particles contain 20% of hydrophilic silica. A suitable silica is 22S from Evonik. The balance consists of ground sodium sulphate, water and miscellaneous. The fine particles are then removed by sieving the agglomerates on a 600 micron mesh sieve. Oversize particles are removed by sieving the agglomerates through a 1400 micron mesh size sieve.

3 kg of the sieved surfactant agglomerates are then put into a 6-litre internal volume paddle mixer from Forberg. 300 g of ground sodium sulphate (d90<100 microns) and 100 g of sodium aluminosilicate type 4A are then added to the mixer and the mixer is run at maximum speed for 2 minutes, thus coating the surface of the agglomerates with sulphate and zeolite. The coated agglomerates are then removed and blended with other detergent materials to give a free-flowing detergent mixture suitable for use.

EXAMPLES

The below tests show a consistently improved whiteness performance profile for low versus high pH brightener comprising powder compositions within a water-soluble unit dose article.

Test 1: Whiteness—Improving Brightener Efficacy:

Test Method:

In order to demonstrate the impact in providing improved whiteness of formulating with a brightener in a low pH powder vs in a high pH powder contained within a PVA film pouch, a whiteness maintenance full scale test has been conducted. A short cotton cycle at 40° C. and 6 gpg water hardness was selected on a Miele washing machine (model 986). Total run time was 1 hour 25 minutes. 2.5 kg cotton ballast loads (sourced from Warwick Equest Ltd. Unit 55, Consett Business Park, Consett, County Durham, DH8 6BN) were added together with a soiled load (8 SBL2004 soiled ballast sheets ex wfk Testgewebe GmbH Christenfeld 10, D-41379 Brüggen-Bracht Germany order ref 10996). White fabric bundles (8 in total containing Terry Towel, Knitted Cotton, Flat Cotton, Polycotton and Polyester sourced from Warwick Equest Ltd. Unit 55, Consett Business Park, Consett, County Durham, DH8 6BN) were added to each machine and washed in either reference product or test product. Four wash cycles were carried out, removing soiled ballast sheets each time and adding four more along with the addition of product. After repeating the wash process four times, whiteness bundles were removed and tumble dried in an electric Miele tumble dryer (Novotronic T430) set to "extra dry".

Fabric tracers were then analysed using a bench-top spectrophotometer Konica-Minolta model CM-3630 which when combined with Polaris White Star software (ex Axiphos GmbH Arend-Braye Str. 42, D-79540 Loerrach, Germany) allows the extraction of reflectance data in the range of 360-740 nm. In order to determine the impact brightener in a low pH powder vs High pH powder on deposition of optical brightener L a b measurements were taken (The lightness, L*, represents the darkest black at L*=0, and the brightest white at L*=100. The colour channels, a* and b*, will represent true neutral grey values at a*=0 and b*=0. The red/green opponent colours are represented along the a* axis, with green at negative a* values and red at positive a* values. The yellow/blue opponent colors are represented along the b* axis, with blue at negative b* values and yellow at positive b* values) a more negative b value showing higher light emission in the blue region (420-470 nm) which is a function of optical brightening agents as they absorb light in the ultraviolet/violet region (340-370 nm) and re-emit in the blue.

Test Products:

| LAS/AE1S Agglomerate | |
|---|---|
| Constituent | % w/w Base Powder |
| LAS Linear alkyl benzene sulfonate | 50 |
| C12-14 Alky Ethoxylate (1) Sulphate | 20 |
| Sodium Sulphate | 7.5 |
| Silica | 18.75 |
| Free water | 3.75 |
| Total | 100 |

| Liquid Additive Mix | |
|---|---|
| Constituent | % w/w |
| Ethoxylated Polyethyleneimine (PEI600EO20 - 80%) | 28 |
| PEG-Vinyl Acetate co-polymer (72.5%) | 38.4 |
| Nonionic surfactant (C24AE7) | 33.6 |
| Total | 100 |

| Test Base - Low pH | |
|---|---|
| Constituent | % w/w Base Powder |
| LAS/AE1S Agglomerate | 67.04 |
| Carboxymethyl cellulose (98%) (Finnfix GDA ex CP Kelco) | 1.77 |
| Texcare SRA300 Soil release polymer | 0.54 |
| Na HEDP Etidronic Acid (86.8%) | 14.25 |
| Zeolite | 2.20 |
| Acusol 4445N Polymer (92.6%) | 4.08 |
| Dow Corning GP-4314 Powdered Antifoam(12% active) | 2.34 |
| Lipase (18.5 mg/g) | 1.99 |
| Stainzyme Plus (14.4 mg/g) | 1.15 |
| Protease | 1.74 |
| Cellulase (15.6 mg/g) | 1.41 |
| Mannanase (4 mg/g) | 1.52 |
| Total | 100.0 |

| Reference Base - High pH | |
|---|---|
| Constituent | % w/w Base Powder |
| LAS/AE1S Agglomerate | 51.84 |
| Carboxymethyl cellulose (98%) (Finnfix GDA ex CP Kelco) | 1.37 |
| Texcare SRA300 Soil release polymer | 0.42 |
| Na HEDP Etidronic Acid (86.8%) | 11.0 |
| Zeolite | 1.70 |
| Acusol 4445N Polymer (92.6%) | 3.15 |
| Dow Corning GP-4314 Powdered Antifoam(12% active) | 1.81 |
| Lipase (18.5 mg/g) | 1.54 |
| Stainzyme Plus (14.4 mg/g) | 0.89 |
| Protease | 1.34 |
| Cellulase (15.6 mg/g) | 1.08 |
| Mannanase (4 mg/g) | 1.17 |
| Sodium Carbonate | 22.93 |
| Total | 100 |

Products Tested

High pH Reference: 13.74 g of High pH reference base powder formulation & 0.11 g of Brightener 49 Tinopal CBS contained in a PVA film* pouch & 1.25 ml of liquid additive mix formulation.

Low pH Test formulation (according to the invention): 10.62 g Low pH test base formulation & 0.11 g of Brightener 49 Tinopal CBS contained in a PVA film* & 1.25 ml liquid additive mix formulation.

PVA Film: M9400 provided by Monosol LLC, 707 East 80th Place, Suite 301, Merrillville, Ind. 4641

Results

As can be seen from the b-values tabulated below, brightener inclusion in the low pH test formulation according to the invention provides a more negative average b value across 4 fabrics tested vs brightener inclusion in high pH reference formulation outside the scope of the invention. This more negative b value results in brighter fabrics.

| b * Value Low pH vs High pH with Brightener | | |
|---|---|---|
| Fabric Type | High pH Ref | Low pH Test |
| Terry Towel | −15.16 | −15.49 |
| Polycotton | −14.69 | −15.82 |

-continued

| b * Value Low pH vs High pH with Brightener | | |
|---|---|---|
| Fabric Type | High pH Ref | Low pH Test |
| Polyester | −14.6 | −14.17 |
| Knitted Cotton | −13.24 | −13.73 |
| Average | −14.42 | −14.80 |

Test 2

The below stain removal tests show a consistently improved performance profile for low versus high pH chelant, and/or acrylate/maleate random copolymer comprising powder compositions within a water soluble pouch.

Test Method:

In order to demonstrate the impact in providing improved cleaning performance of formulating a low pH powder vs a high pH powder contained within a PVA film pouch, a stain removal full scale test has been conducted. A short cotton cycle at 40° C. and 6 gpg water hardness was selected on a Miele washing machine (model 3622), total run time was 1 hour 25 minutes. 2.5 kg cotton ballast loads (sourced from Warwick Equest Ltd. Unit 55, Consett Business Park, Consett, County Durham, DH8 6BN) were added together with a soiled load (4 SBL2004 soiled ballast sheets ex wfk Testgewebe GmbH Christenfeld 10, D-41379 Brüggen-Bracht Germany). Stain sets (sourced from Warwick Equest Ltd. Unit 55, Consett Business Park, Consett, County Durham, DH8 6BN) were added to each machine and washed in either high pH reference product or low pH test product. Four wash cycles were carried out, removing soiled ballast sheets each time and adding four more along with the addition of product. After repeating the wash process four times, stain sets were removed and tumble dried in an electric Miele tumble dryer (Novotronic T430) set to "extra dry". Stains were then analysed using a Stain Removal Index (SRI), the higher the SRI value the better the stain removal performance is. ΔSRI denoted the difference in SRI between the Reference and Test products.

Test Products:

| LAS/AE1S Agglomerate | |
|---|---|
| Constituent | % w/w Base Powder |
| LAS Linear alkyl benzene sulfonate | 50 |
| C12-14 Alky Ethoxylate (1) Sulphate | 20 |
| Sodium Sulphate | 7.5 |
| Silica | 18.75 |
| Free water | 3.75 |
| Total | 100 |

| Liquid Additive Mix | |
|---|---|
| Constituent | % w/w |
| Ethoxylated Polyethyleneimine (PEI600EO20 - 80%) | 28 |
| PEG-Vinyl Acetate co-polymer (72.5%) | 38.4 |
| Nonionic surfactant (C24AE7) | 33.6 |
| Total | 100 |

A. Grass Cleaning Performance:

| Test Base - Low pH | |
|---|---|
| Constituent | %w/w Base Powder |
| LAS/AE1S Agglomerate | 69.65 |
| Carboxymethyl cellulose (98%) (Finnfix GDA ex CP Kelco) | 1.84 |
| Brightener 49 Tinopal ® CBS-X | 1.21 |
| Texcare SRA300 Soil release polymer | 1.14 |
| Na HEDP Etidronic Acid (86.8%) | 14.81 |
| Zeolite | 2.28 |
| Dow Corning GP-4314 Powdered Antifoam (12% active) | 2.43 |
| Lipase (18.5 mg/g) | 2.07 |
| Stainzyme Plus (14.4 mg/g) | 1.20 |
| Protease | 1.80 |
| Mannanase (4 mg/g) | 1.57 |
| Total | 100 |

| Reference Base - High pH | |
|---|---|
| Constituent | % w/w Base Powder |
| LAS/AE1S Agglomerate | 53.57 |
| Carboxymethyl cellulose (98%) (Finnfix GDA ex CP Kelco) | 1.42 |
| Brightener 49 Tinopal ® CBS-X | 0.93 |
| Texcare SRA300 Soil release polymer | 0.88 |
| Na HEDP Etidronic Acid (86.8%) | 11.39 |
| Zeolite | 1.75 |
| Dow Corning GP-4314 Powdered Antifoam (12% active) | 1.87 |
| Lipase (18.5 mg/g) | 1.59 |
| Stainzyme Plus (14.4 mg/g) | 0.92 |
| Protease | 1.38 |
| Mannanase (4 mg/g) | 1.21 |
| Sodium Carbonate | 23.08 |
| Total | 100 |

Products Tested

Low pH Test leg A: 10.69 g of Low pH test base formulation contained in a PVA film* pouch & liquid addition of 0.42 g of non-ionic surfactant (C24AE7).

Low pH Test leg B: 10.69 g Low pH test base formulation and 0.45 g Acusol 445N contained in a PVA film* pouch & liquid addition of 0.42 g of non-ionic surfactant (C24AE7).

High pH Ref A: 13.90 g of High pH reference base formulation contained in a PVA film* pouch & liquid addition of 0.42 g of non-ionic surfactant (C24AE7).

High pH Ref B: 13.90 g High pH reference base formulation and 0.45 g Acusol 445N contained in a PVA film* pouch & liquid addition of 0.42 g of non-ionic surfactant (C24AE7).

PVA Film: M9400 provided by Monosol LLC, 707 East 80th Place, Suite 301, Merrillville, Ind. 4641

Results

The results tabulated below show that there is improved stain removal of grass stains in a low versus a high pH formulation, the performance delta getting magnified in presence versus in absence of Acusol 445N technology.

| Soil | Low pH Test without Acusol 445N | High pH Test without Acusol 445N | Low pH Test with Acusol 445N | High pH Test with Acusol 445N |
|---|---|---|---|---|
| Grass | 45.7 | 44.4 | 53.6 | 40.5 |

B. Bleachable Stain Cleaning Performance:

| Test Base-Low pH | |
|---|---|
| Constituent | % w/w Base Powder |
| LAS/AE1S Agglomerate | 76.82 |
| Carboxymethyl cellulose (98%) (Finnfix GDA ex CP Kelco) | 2.04 |
| Brightener 49 Tinopal ® CBS-X | 1.34 |
| Texcare SRA300 Soil release polymer | 0.62 |
| Acusol 4445N Polymer (92.6%) | 4.69 |
| Zeolite | 2.53 |
| Dow Corning GP-4314 Powdered Antifoam (12% active) | 2.69 |
| Lipase (18.5 mg/g) | 2.29 |
| Stainzyme Plus (14.4 mg/g) | 1.33 |
| Protease | 2.00 |
| Cellulase (15.5 mg/g) | 1.62 |
| Mannanase (4 mg/g) | 1.75 |
| Total | 100 |

| Reference Base-High pH | |
|---|---|
| Constituent | % w/w Base Powder |
| LAS/AE1S Agglomerate | 57.50 |
| Carboxymethyl cellulose (98%) (Finnfix GDA ex CP Kelco) | 1.52 |
| Brightener 49 Tinopal ® CBS-X | 1.00 |
| Texcare SRA300 Soil release polymer | 0.46 |
| Acusol 4445N polymer (92.6%) | 3.49 |
| Zeolite | 1.88 |
| Dow Corning GP-4314 Powdered Antifoam (12% active) | 2.01 |
| Lipase (18.5 mg/g) | 1.72 |
| Stainzyme Plus (14.4 mg/g) | 0.99 |
| Protease | 1.49 |
| Cellulase (15.6 mg/g) | 1.20 |
| Mannanase (4 mg/g) | 1.30 |
| Sodium Carbonate | 25.44 |
| Total | 100 |

Products Tested

High pH Ref A: 11.65 g of High pH Ref base formulation contained in a PVA film* pouch & 1.25 ml of liquid additive mix.

Low pH Test leg A: 8.52 g of Low pH Test base formulation contained in a PVA film* pouch & 1.25 ml of liquid additive mix.

High pH Ref B: 11.65 g of High pH Ref base formulation and 1.35 g of NaHEDP Etidronic Acid (86.8%) contained in a PVA film* pouch & 1.25 ml of liquid additive mix.

Low pH Test leg B: 8.52 g of Low pH Test base formulation and 1.35 g of NaHEDP Etidronic Acid (86.8%) contained in a PVA film* pouch & 1.25 ml of liquid additive mix.

PVA Film: M9400 provided by Monosol LLC, 707 East 80th Place, Suite 301, Merrillville, Ind. 4641

Results

The results tabulated below show that there is improved stain removal of tea and red wine bleachable stains in a low versus a high pH formulation, the performance delta getting magnified in presence versus in absence of NaHEDP technology.

| Soil | High pH Ref without NaHEDP | Low pH Test without NaHEDP | High pH Ref with NaHEDP | Low pH Test with NaHEDP |
|---|---|---|---|---|
| Tea | 10.8 | 28.7 | 11.0 | 38.4 |
| Red Wine | 42.0 | 61.9 | 46.4 | 72.0 |
| Average | 26.4 | 45.3 | 28.7 | 55.2 |

Test 3

The below test shows a consistently improved fabric feel performance profile for low versus high pH cationically modified polysaccharide comprising powder compositions within a water soluble pouch.

Test Method:

In order to show the impact in providing improved fabric feel benefits of formulating with a low pH powder vs high pH powder contained within a water soluble pouch in presence & absence of modified hydroxyethyl cellulose, a softness full scale test has been conducted. Black cotton bath towels (sourced from The Range retail shop, North Tyne Industrial Estate, Whitley Rd, Benton NE12 9EZ, United Kingdom) were desized using a Miele machine (model 1714), cotton short cycle, 60° C., city water (7.8 gpg), total wash time 1 hour 25 mins×3 wash cycles, the first cycle containing 38 g of ECE standard detergent (sourced from wfk Testgewebe GmbH, Christenfeld 10, D-41379 Brüggen, Germany) the remaining two cycles were run with no product. Fabrics were dried using a gas dryer set at medium heat for 30 minutes and consequently cut into 15 cm×15 cm swatches×8 ready to be used in full scale test the following day. For the softness test a short cotton cycle at 40° C. and 6 gpg hardness has been selected on a Miele washing machine (model 3622). Total run time was 1 hour and 25 minutes, 2.5 kg cotton ballast loads (sourced from Calderon Textiles) were added to each machine and washed in either reference A/B or test product A/B. Four wash cycles were carried out. Black towel tracers were removed and left overnight to dry in drying room (20° C./55% RH) and were then paneled by 3 panelists the following day to assess the softness grading, using pairwise comparison Ref A vs Test A, Ref B vs Test B, following standard grading scale:

Grading Scale

4—This product on the left is a whole lot better.

3—This product on the left is a lot better.

2—I know this product on the left is a little better.

1—I think this product on the left is better.

0—There is no difference between the two products.

Test Products:

| LAS/AE1S Agglomerate | |
|---|---|
| Constituent | % w/w Base Powder |
| LAS Linear alkyl benzene sulfonate | 50 |
| C12-14 Alky Ethoxylate (1) Sulphate | 20 |
| Sodium Sulphate | 7.5 |
| Silica | 18.75 |
| Free water | 3.75 |
| Total | 100 |

| Liquid Additive Mix | |
| --- | --- |
| Constituent | % w/w |
| Ethoxylated Polyethyleneimine (PEI600EO20-80%) | 28 |
| PEG-Vinyl Acetate co-polymer (72.5%) | 38.4 |
| Nonionic surfactant (C24AE7) | 33.6 |
| Total | 100 |

| Test Base-Low pH | |
| --- | --- |
| Constituent | % w/w Base Powder |
| LAS/AE1S Agglomerate | 66.27 |
| Carboxymethyl cellulose (98%) (Finnfix GDA ex CP Kelco) | 1.75 |
| Brightener 49 Tinopal ® CBS-X | 1.15 |
| Texcare SRA300 Soil release polymer | 0.53 |
| Na HEDP Etidronic Acid (86.8%) | 14.09 |
| Zeolite | 2.17 |
| Acusol 4445N Polymer (92.6%) | 4.03 |
| Dow Corning GP-4314 Powdered Antifoam (12% active) | 2.31 |
| Lipase (18.5 mg/g) | 1.97 |
| Stainzyme Plus (14.4 mg/g) | 1.14 |
| Protease | 1.72 |
| Cellulase (15.6 mg/g) | 1.39 |
| Mannanase (4 mg/g) | 1.50 |

| Reference Base-High pH | |
| --- | --- |
| Constituent | % w/w Base Powder |
| LAS/AE1S Agglomerate | 51.25 |
| Carboxymethyl cellulose (98%) (Finnfix GDA ex CP Kelco) | 1.35 |
| Brightener 49 Tinopal ® CBS-X | 0.89 |
| Texcare SRA300 Soil release polymer | 0.41 |
| Na HEDP Etidronic Acid (86.8%) | 10.89 |
| Zeolite | 1.68 |
| Acusol 4445N Polymer (92.6%) | 3.11 |
| Dow Corning GP-4314 Powdered Antifoam (12% active) | 1.79 |
| Lipase (18.5 mg/g) | 1.53 |
| Stainzyme Plus (14.4 mg/g) | 0.88 |
| Protease | 1.33 |
| Cellulase (15.6 mg/g) | 1.07 |
| Mannanase (4 mg/g) | 1.16 |
| Sodium Carbonate | 22.67 |

Products Tested:
  High pH Ref A (nil cationically modified polysaccharide): 13.9 g of High pH reference base formulation contained in a PVA film* pouch & 1.25 ml of Liquid additive mix formulation.
  High pH Ref B (with cationically modified polysaccharide): 13.9 g of High p H reference base formulation & 0.2 g of modified hydroxyethyl cellulose (Polymer PK ex Dow company) contained in a PVA film* pouch & 1.25 ml of liquid additive mix formulation.
  Low pH Test leg A (nil cationically modified polysaccharide): 10.75 g of Low pH reference formulation contained in a PVA film* pouch & 1.25 ml Liquid additive mix formulation.
  Low pH Test leg B (with cationically modified polysaccharide): 10.75 g of Low pH reference formulation & 0.2 g of modified hydroxyethyl cellulose (Polymer PK ex Dow company) contained in a PVA film* & 1.25 ml of liquid additive mix formulation.
  PVA Film: M9400 provided by Monosol LLC, 707 East 80th Place, Suite 301, Merrillville, Ind. 4641

Results

The results tabulated below show an improved fabric feel benefit for a low versus high pH powder formulation, a benefit that is further enhanced in presence versus in absence of CatHEC technology.

| | Low pH (Preference) | High pH (Preference) | Low pH vs High pH grading |
| --- | --- | --- | --- |
| Nil cationically modified polysaccharide | 62% | 38% | +0.67 |
| With cationically modified polysaccharide | 88% | 12% | +1.47 |

Test 4

The below test shows a consistently improved perfume headspace performance profile for low versus high pH perfume comprising powder compositions within a water soluble pouch.

Test Method:

In order to show the impact in providing improved perfume headspace benefits of formulating with a low pH powder vs high pH powder contained within a pouch, a full scale wash test has been conducted in combination with a Gas Chromatography (GC) headspace analysis. 4 Tonrose bath towels (ca 2 kg, sourced from Tonrose Ltd, Tonrose House, Petre Road, Accrington, Lancashire, BB5 5JB-United Kingdom) were washed in a Miele washing machine (model 3922—cotton short cycle, 60° C., city water –7.8 gpg-, total wash time 1 hour 25 mins). 0.5 g of GP-4314 Powdered Antifoam suds suppressor technology (sourced from the Dow Corning company) has been added to prevent over-sudsing. The wash cycle was stopped after 39 minutes, i.e. 2 minutes prior to onset of rinse cycle, and a sample of the wash water was taken using a 10 ml syringe. 5 mls of this wash solution is added to a 20 ml headspace vial (Sigma # Vials=SU860097, Caps=SU860101) and submitted for GC analysis of Ester content in headspace. A total of 6 replicates (3 different washes and 2 samples per wash) were tested for both the low pH test product and the high pH reference products. Relative averaged testing results are summarized below.

Test Products:

| LAS/AE1S Agglomerate | |
| --- | --- |
| Constituent | % w/w Base Powder |
| LAS Linear alkyl benzene sulfonate | 50 |
| C12-14 Alky Ethoxylate (1) Sulphate | 20 |
| Sodium Sulphate | 7.5 |
| Silica | 18.75 |
| Free water | 3.75 |
| Total | 100 |

| Liquid Additive Mix | |
| --- | --- |
| Constituent | % w/w |
| Ethoxylated Polyethyleneimine (PEI600EO20-80%) | 20 |
| PEG-Vinyl Acetate co-polymer (72.5%) | 27 |

-continued

Liquid Additive Mix

| Constituent | % w/w |
| --- | --- |
| Nonionic surfactant (C24AE7) | 24 |
| Perfume Accord | 29 |
| Total | 100 |

Perfume Accord

| | Composition |
| --- | --- |
| Benzyl Acetate | 1.5 mL |
| Allyl Cyclohexane Propionate | 1.5 mL |
| Hexyl Acetate | 1.5 mL |
| Frutene | 1.5 mL |
| Verdox (OTBCA) | 1.5 mL |
| Allyl Amyl Glycolate | 1.5 mL |
| Flor Acetate | 1.5 mL |
| TRICYCLODECENYL ACETATE | |
| Hedione (Methyl Dihydro Jasmonate) | 1.5 mL |
| Hexyl Salicylate | 1.5 mL |
| Cyclohexyl Salicylate | 1.5 mL |
| Eucalyptol | 1.5 mL |
| Geraniol | 1.5 mL |
| Citronellol | 1.5 mL |

Test Base-Low pH

| Constituent | % w/w Base Powder |
| --- | --- |
| LAS/AE1S Agglomerate | 66.27 |
| Carboxymethyl cellulose (98%) (Finnfix GDA ex CP Kelco) | 1.75 |
| Brightener 49 Tinopal ® CBS-X | 1.15 |
| Texcare SRA300 Soil release polymer | 0.53 |
| Na HEDP Etidronic Acid (86.8%) | 14.09 |
| Zeolite | 2.17 |
| Acusol 4445N Polymer (92.6%) | 4.03 |
| Dow Corning GP-4314 Powdered Antifoam (12% active) | 2.31 |
| Lipase (18.5 mg/g) | 1.97 |
| Stainzyme Plus (14.4 mg/g) | 1.14 |
| Protease | 1.72 |
| Cellulase (15.6 mg/g) | 1.39 |
| Mannanase (4 mg/g) | 1.50 |

Reference Base-High pH

| Constituent | % w/w Base Powder |
| --- | --- |
| LAS/AE1S Agglomerate | 51.25 |
| Carboxymethyl cellulose (98%) (Finnfix GDA ex CP Kelco) | 1.35 |
| Brightener 49 Tinopal ® CBS-X | 0.89 |
| Texcare SRA300 Soil release polymer | 0.41 |
| Na HEDP Etidronic Acid (86.8%) | 10.89 |
| Zeolite | 1.68 |
| Acusol 4445N Polymer (92.6%) | 3.11 |
| Dow Corning GP-4314 Powdered Antifoam (12% active) | 1.79 |
| Lipase (18.5 mg/g) | 1.53 |
| Stainzyme Plus (14.4 mg/g) | 0.88 |
| Protease | 1.33 |
| Cellulase (15.6 mg/g) | 1.07 |
| Mannanase (4 mg/g) | 1.16 |
| Sodium Carbonate | 22.67 |

Products Tested:
High pH Ref: 13.9 g of High pH reference base formulation contained in a PVA film* pouch & 1.75 ml of Liquid additive mix formulation.
Low pH Test leg: 10.75 g of Low pH reference formulation contained in a PVA film* pouch & 1.75 ml Liquid additive mix formulation.
PVA Film: M9400 provided by Monosol LLC, 707 East 80th Place, Suite 301, Merrillville, Ind. 4641

Results

The results tabulated below show an improved perfume headspace performance for benzyl acetate and methyl dihydro jasmonite perfume materials for a low versus high pH powder formulation (expressed as relative amount of PRM in headspace). Beyond for allyl amyl glycolate, no material was detected in the headspace for the high pH formulation, contrary to the low pH formulation.

| | % Change in PRM level in headspace |
| --- | --- |
| Benzyl acetate | 213% |
| Methyl dihydro jasmonite | 121% |

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A water-soluble unit dose article comprising a water-soluble film and a solid laundry detergent composition, wherein the water-soluble film defines a first internal compartment and wherein the solid laundry detergent composition is comprised within the first internal compartment, and wherein the water-soluble unit dose article composition comprises at least one of the following components (a.-f.):
  a. between about 0.05% and about 2% by weight of the solid laundry detergent composition of a whitening agent selected from a hueing dye and an optical brightener;
  b. between about 0.001% and about 1% by weight of the solid laundry detergent composition of the enzyme;
  c. a stain removal active selected from acrylate/maleate random copolymer, a chelant or a mixture thereof, and wherein if present the acrylate/maleate random copolymer comprises between about 0.5% and about 15%, by weight of the solid laundry detergent composition and if present the chelant comprises between about 1% and about 20% by weight of the solid laundry detergent composition;
d. between about 0.05% and about 5% by weight of the solid laundry detergent composition of a cationically modified polysaccharide;
e. a capsule, wherein the capsule comprises a shell and a core wherein the core comprises a perfume and wherein the perfume is present between about 0.05% and about 10% by weight of the solid laundry detergent composition;
f. or a mixture thereof;
wherein the solid composition at about 1 wt % dilution in deionized water at about 20° C., has an equilibrium pH in the range of from about 6.5 to about 8.8.

2. The water-soluble unit dose article according to claim 1, wherein the solid laundry detergent composition comprises from about 0 wt % to about 10 wt % of carbonate salt wherein the carbonate salts are selected from sodium carbonate, potassium carbonate, sodium bicarbonate, sodium bicarbonate, burkeite, sesquicarbonate habit modified carbonate, crystal growth modified burkeite or a mixture thereof.

3. The water-soluble unit dose article according to claim 1, wherein the optical brightener is selected from hydrophobic brighteners, stilbene brighteners, biphenyl brighteners or a mixture thereof.

4. The water-soluble unit dose article according to claim 1, wherein the enzyme is selected from the group comprising hemicellulases, peroxidases, proteases, cellulases, xylanases, lipases, phospholipases, esterases, cutinases, pectinases, keratanases, reductases, oxidases, phenoloxidases, lipoxygenases, ligninases, pullulanases, tannases, pentosanases, malanases, ß-glucanases, arabinosidases, hyaluronidase, chondroitinase, laccase, and amylases, or mixtures thereof.

5. The water-soluble unit dose article according to claim 1, wherein the chelant is selected from amino carboxylates, amino phosphonates, polyfunctionally-substituted aromatic chelating agents and mixtures thereof.

6. The water-soluble unit dose article according to claim 1 wherein the acrylate/maleate random copolymer has a molecular weight of from about 50,000 Da to about 100,000 Da.

7. The water-soluble unit dose article according to claim 1, wherein the cationically modified polysaccharide is selected from cationic guar gums, cationic cellulosic polymers, and mixtures thereof.

8. The water-soluble unit dose article according to claim 7, wherein the cationically modified polysaccharide is selected from cationically modified hydroxyethyl cellulose, cationically modified hydroxypropyl cellulose, cationically and hydrophobic ally modified hydroxyethyl cellulose, cationically and hydrophobically modified hydroxypropyl cellulose, or a mixture thereof.

9. The water-soluble unit dose article according to claim 1, wherein the shell material comprises, aminoplast, polyacrylate, polyacrylamide, silicones, silica, polystyrene, polyurea, polyurethanes, resorcinol, gelatin, polyamides, or mixtures thereof.

10. The water-soluble unit dose article according to claim 1 wherein the solid laundry detergent composition comprises a non-soap anionic surfactant and wherein the non-soap anionic surfactant comprises linear alkylbenzene sulphonate, alkoxylated alkyl sulphate or a mixture thereof.

11. The water-soluble unit dose article according to claim 10 wherein the solid laundry detergent composition comprises between about 20% and about 75% by weight of the solid laundry detergent composition of the non-soap anionic surfactant.

12. The water-soluble unit dose article according to claim 11 wherein the solid laundry detergent composition comprises between about 30% and about 70% by weight of the solid laundry detergent composition of the non-soap anionic surfactant.

13. The water-soluble unit dose article according to claim 1 wherein the solid laundry detergent composition comprises between about 1% and about 10% by weight of the solid laundry detergent composition of an organic acid.

14. The water-soluble unit dose article according to claim 13 and wherein the organic acid is a carboxylic acid selected from citric acid, malic acid, lactic acid, propionic acid, valeric acid, caproic acid, carbonic acid, adipic acid, gluconic acid, methylglycinediacetic acid or a mixture thereof.

15. The water-soluble unit dose article according to claim 1 wherein the solid laundry detergent composition is a free flowing particulate solid, a compressed particulate solid or a mixture thereof and has a mean particle size between about 400 microns and about 1000 microns.

16. The water-soluble unit dose article according to claim 1 wherein the solid laundry detergent composition has a bulk density of between about 400 and about 1000 g/l.

17. The water-soluble unit dose article according to claim 1 wherein the first compartment comprises between about 1 g and about 25 g of the solid laundry composition.

18. The water-soluble unit dose article according to claim 1 wherein the water-soluble film comprises polyvinyl alcohol.

19. The water-soluble unit dose article according to claim 1 wherein the water-soluble unit dose article comprises at least a first compartment and a second compartment.

20. A method of washing comprising the steps of adding the water-soluble unit dose article according to claim 1 to sufficient water to dilute the solid laundry detergent composition by a factor of at least about 300 fold to create a wash liquor and contacting fabrics to be washed with said wash liquor.

* * * * *